United States Patent
Bai et al.

(10) Patent No.: US 12,063,614 B2
(45) Date of Patent: Aug. 13, 2024

(54) METHOD AND APPARATUS FOR ESTIMATING AND COMPENSATING TIMING ADVANCE

(71) Applicant: Telefonaktiebolaget LM Ericsson (PUBL), Stockholm (SE)

(72) Inventors: Wenling Bai, Beijing (CN); Mats Åhlander, Solna (SE); Juan Serrato Vital, Lund (SE); Ruiping Wei, Beijing (CN); Yang Hu, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 402 days.

(21) Appl. No.: 17/435,081

(22) PCT Filed: Feb. 27, 2020

(86) PCT No.: PCT/CN2020/076949
§ 371 (c)(1),
(2) Date: Aug. 31, 2021

(87) PCT Pub. No.: WO2020/177610
PCT Pub. Date: Sep. 10, 2020

(65) Prior Publication Data
US 2022/0150855 A1 May 12, 2022

(51) Int. Cl.
*H04W 4/00* (2018.01)
*H04B 7/06* (2006.01)
(Continued)

(52) U.S. Cl.
CPC ........ *H04W 56/005* (2013.01); *H04B 7/0617* (2013.01); *H04L 25/0204* (2013.01); *H04W 56/001* (2013.01)

(58) Field of Classification Search
None
See application file for complete search history.

(56) References Cited

U.S. PATENT DOCUMENTS

2012/0127964 A1   5/2012  Turtinen et al.
2013/0322575 A1*  12/2013 Muquet ............... H04L 27/2647
                                                       375/340
(Continued)

FOREIGN PATENT DOCUMENTS

CN   101606325 A   12/2009
CN   102972000 A    3/2013
(Continued)

OTHER PUBLICATIONS

EPO Communication and Supplementary Search Report dated Apr. 4, 2022 for Patent Application No. 20766395.6, consisting of 5-pages.
(Continued)

*Primary Examiner* — Zewdu A Beyen
(74) *Attorney, Agent, or Firm* — Weisberg I.P. Law, P.A.

(57) ABSTRACT

A method performed by a communication node and an apparatus for operating the method are proposed. The method includes obtaining matched filter channel estimation associated with a user equipment (UE); obtaining first Timing Advance (TA) compensated channel estimation; obtaining first noise suppressed channel estimation; and obtaining first TA estimation associated with the UE based on the first noise suppressed channel estimation.

14 Claims, 9 Drawing Sheets

(51) Int. Cl.
    *H04L 25/02*     (2006.01)
    *H04W 56/00*     (2009.01)

(56) References Cited

U.S. PATENT DOCUMENTS

2015/0189610 A1*    7/2015    Siomina .................... H04L 5/14
                                                                                                370/280
2019/0253281 A1*    8/2019    Gau .......................... H04L 5/00

FOREIGN PATENT DOCUMENTS

| CN | 103283199 A | 9/2013 | |
|---|---|---|---|
| CN | 106506412 A | 3/2017 | |
| CN | 108832965 A | 11/2018 | |
| EP | 2051390 A2 * | 4/2009 | ........... H03F 1/3294 |
| EP | 3346777 A2 | 7/2018 | |
| WO | 2018 202038 A1 | 11/2018 | |

OTHER PUBLICATIONS

3GPP TSG RAN WG6 #3; Athens, Greece; Source: Nokia; Serving Cell TA Estimation for Multilateration Positioning; Agenda item 6.1.1 (R6-170045)—Feb. 13-17, 2017.

PCT Notification of Transmittal of the International Search Report and the Written Opinion of the International Searching Authority, or the Declaration issued for International application No. PCT/CN2020/076949—May 27, 2020.

Chinese Office Action with English Machine Translation dated Jun. 2, 2023 for Patent Application No. 202080018598.0, consisting of 13-pages.

\* cited by examiner

METHOD AND APPARATUS FOR ESTIMATING AND COMPENSATING TIMING ADVANCE

PRIORITY

This nonprovisional application is a U.S. National Stage Filing under 35 U.S.C. § 371 of International Patent Application Serial No. PCT/CN2020/076949 filed Feb. 27, 2020 and entitled "METHOD AND APPARATUS FOR ESTIMATING AND COMPENSATING TIMING ADVANCE" which claims priority to International Patent Application No. PCT/CN2019/076891 filed Mar. 4, 2019 both of which are hereby incorporated by reference in their entirety.

FIELD OF THE INVENTION

The present disclosure generally relates to communication networks, and more specifically, to estimate and compensate timing advance (TA) in a communication network.

BACKGROUND

This section introduces aspects that may facilitate a better understanding of the present disclosure. Accordingly, the statements in this section are to be read in this light and are not to be understood as admissions about what is in the prior art or what is not in the prior art.

With the rapid development of networking and communication technologies, wireless communication networks such as long-term evolution (LTE)/fourth generation (4G) networks and new radio (NR)/fifth generation (5G) networks are expected to achieve high traffic capacity and end-user data rate with lower latency. To meet the diverse requirements of new services across a wide variety of industries, timing advance (TA) or TA value, which corresponds to the length of time a signal takes to reach a base station (e.g., eNB or gNB) from a user equipment (UE) is one of the critical parameters to provide accurate signal transmission. It is desirable to develop a method, an apparatus and a system to provide precise TA estimation and compensation.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

With the rapid development of networking and communication technologies, multiple-input and multiple-output (MIMO) are commonly used to improve the robustness of data transmission or to increase data rates. In the conventional communication system, such as legacy LTE, the TA adjustment is estimated by a base station (e.g., eNB or gNB) based on uplink reference symbols (RS) and sent to a UE via a TA command. After receiving the TA command, the UE would determine the TA adjustment and then adjusts uplink timing based on the TA adjustment.

However, the granularity of the TA adjustment in the TA command based on the existing techniques is relatively large, which will decrease the accuracy of the TA adjustment and degrade the performance (e.g., the estimation of the downlink channel and/or the calculation of the beamforming weights) of the MIMO system.

In a time-division duplexing (TDD) system, data transmitted in an uplink and a downlink are operated in the same spectrum, and thus the characteristics of the channel of the uplink transmission and that of the downlink transmission are the same as well (i.e., reciprocity). Therefore, a feedback from a User Equipment (UE) is not required because an uplink reference signal can be used to estimate downlink channel and/or to calculate the beamforming weights.

As mentioned above, since the uplink reference signal can be used to estimate downlink channel, the TA estimation would not be limited by the granularity of the TA command. In view of the above, the present disclosure proposes a solution for providing TA estimation or adjustment with higher accuracy, which can improve the performance (e.g., the estimation of the downlink channel and/or the calculation of the beamforming weights) for a TDD system.

According to a first aspect of the present disclosure, there is provided a method performed by a communication node. The method includes obtaining matched filter channel estimation associated with a user equipment (UE); obtaining first Timing Advance (TA) compensated channel estimation; obtaining first noise suppressed channel estimation; and obtaining first TA estimation associated with the UE based on the first noise suppressed channel estimation.

According to a second aspect of the present disclosure, there is provided an apparatus. The apparatus may include one or more processors and one or more memories comprising computer program codes. The one or more memories and the computer program codes are configured to, with the one or more processors, cause the apparatus at least to perform any step of the method according to the first aspect of the present disclosure.

According to a third aspect of the present disclosure, there is provided a computer-readable medium having computer program codes embodied thereon which, when executed on a computer, cause the computer to perform any step of the method according to the first aspect of the present disclosure.

BRIEF DESCRIPTION OF THE DRAWINGS

For a better understanding of the nature and objects of some embodiments of the present disclosure, reference should be made to the following detailed description taken in conjunction with the accompanying drawings. In the drawings, identical or functionally identical elements are given the same reference numbers unless otherwise specified.

DETAILED DESCRIPTION

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the present disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the present disclosure may be combined in any suitable manner in one or more embodiments. One skilled in the relevant art will recognize that the present disclosure may be practiced without one or more of the specific features or advantages of a particular embodiment. In other instances, additional features and advantages may be recognized in certain embodiments that may not be present in all embodiments of the present disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The phrase "based on" means "based at least in part on". The terms "one embodiment" and "an embodiment" mean "at least one embodiment". The term "another embodiment" means "at least one other embodiment". Other definitions, explicit and implicit, may be included below.

Figure 1:
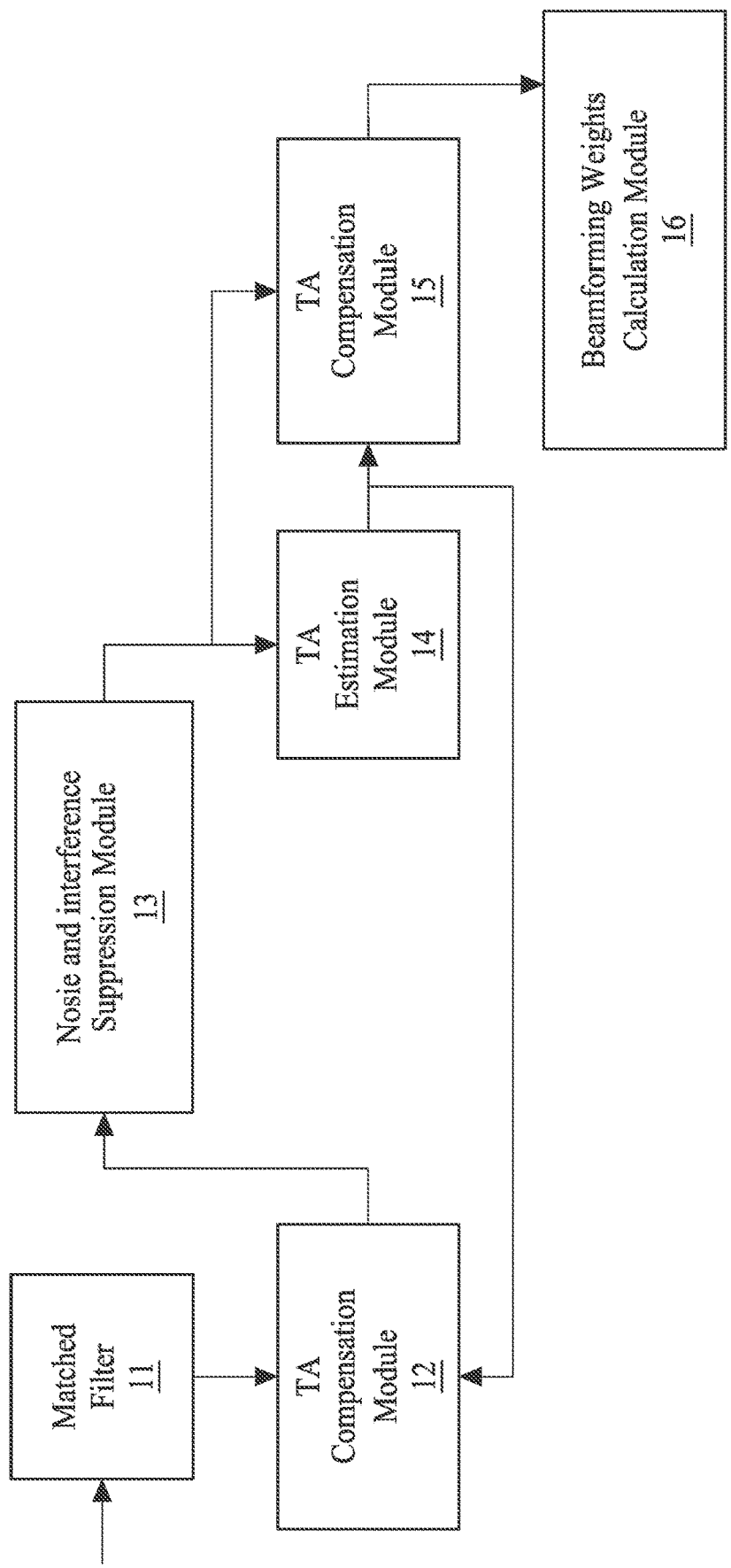
FIG. 1 is a functional block diagram illustrating an example of a system of a base station according to some embodiments of the present disclosure.

FIG. 1 is a functional block diagram illustrating an example of a system 1 of a base station (e.g., eNB or gNB) according to some embodiments of the present disclosure. In some embodiments, the system 1 includes a matched filter 11, a TA compensation module 12 (or pre-TA compensation module), a noise and interference suppression module 13, a TA estimation module 14, a TA compensation module 15 (or post-TA compensation module) and a beamforming weights calculation module 16. In some embodiments, the modules mentioned above can be implemented by hardware, software or firmware depending on different design requirements.

The matched filter 11 is configured to receive a reference signal (RS) from a UE at receive branches and to generate matched filter channel estimation associated with the UE. The RS may be a Sounding Reference Signal (SRS), or a Demodulation Reference Signal (DMRS) or other uplink reference signal and is not limited here.

The TA compensation module 12 is coupled to the matched filter 11. In some embodiments, the TA compensation module 12 is configured to receive the matched filter channel estimation from the matched filter 11 and to generate pre-TA compensated channel estimation based on the matched filter channel estimation.

The noise and interference suppression module 13 is coupled to the TA compensation module 12. In some embodiments, the noise and interference suppression module 13 is configured to receive the pre-TA compensated channel estimation and to generate noise and interference suppressed channel estimation based on the pre-TA compensated channel estimation.

The TA estimation module 14 is coupled to the noise and interference suppression module 13. In some embodiments, the TA estimation module 14 is configured to receive the noise and interference suppressed channel estimation and to generate TA estimation based on the noise and interference suppressed channel estimation. The generated TA estimation may be forwarded to the TA compensation module 15 and feedback to the TA compensation module 12.

The TA compensation module 15 is coupled to the noise and interference suppressed channel estimation module 13 and the TA estimation module 14. In some embodiments, the TA compensation module 15 is configured to receive the TA estimation from the TA estimation module 14 and to generate TA compensated channel estimation (also can be referred to "post-TA compensated channel estimation") by adjusting the noise and interference suppressed channel estimation with the TA estimation.

The beamforming weights calculation module 16 is coupled to the TA compensation module 15. In some embodiments, the beamforming weights calculation module 16 is configured to receive the post-TA compensated channel estimation from the TA compensation module 15 and to generate beaming weights of branches received from the UE based on the post-TA compensated channel estimation. In some embodiments, the branch represents one antenna in an antenna arrays or one of the radiation beams.

In some embodiments, each of the modules illustrated in FIG. 1 can be arbitrarily enabled or disabled depending on different requirements or designs. For example, in the case that the TA compensation module 12 is disabled, the noise and interference suppression module 13 is configured to receive the matched filter channel estimation generated by the matched filter 11 and to generate the noise and interference suppressed channel estimation according to the matched filter channel estimation. For example, in the case that the TA compensation module 15 is disabled, the beamforming weights calculation module 16 is configured to receive the noise and interference suppressed channel estimation from the noise and interference suppression module 13 and to generate beaming weights of branches received from the UE based on the noise and interference suppressed channel estimation. In some embodiments, the system 1 may include feedback mechanism. For example, the TA estimation generated by the TA estimation module 14 can be fed to the TA compensation module 12, and the TA compensation module 12 is configured to generate the TA compensated channel estimation based on the TA estimation generated previously. It is appreciated that some modules depicted in FIG. 1 can be repeatedly arranged and the connection orders of the modules can be adjusted based on various embodiments of the present disclosure. The operation of the system 1 of various embodiments will be shown in FIGS. 2-8 and corresponding descriptions.

Figure 2:
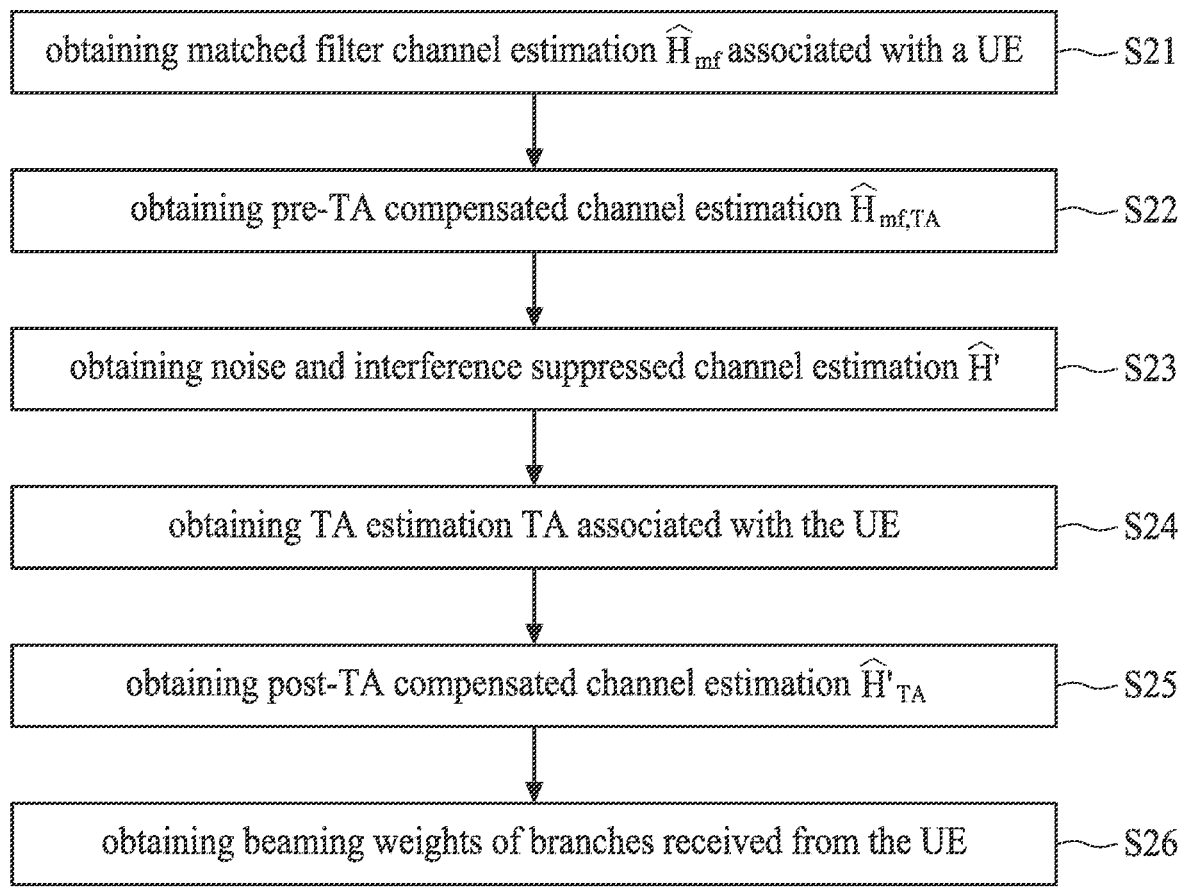
FIG. 2 is a flowchart illustrating a method in accordance with some embodiments of the present disclosure.

FIG. 2 is a flowchart illustrating a method in accordance with some embodiments of the present disclosure. In some embodiments, the method in FIG. 2 can be performed by the system 1 as shown in FIG. 1. Alternatively, the method in FIG. 2 can be performed by any other suitable systems or modules of a communication node.

Referring to the operation S21, matched filter channel estimation $\hat{H}_{mf}$ associated with a UE is obtained. The matched filter channel estimation $\hat{H}_{mf}$ is obtained based on reference signals received from a UE at receive branches. In some embodiments, the matched filter channel estimation $\hat{H}_{mf}$ can be denoted as $\hat{H}_{mf,u}(k,r)$ calculated by the following equation Eq. (1):

$$\hat{H}_{mf,u}(k,r) = Y_u(k,r) \cdot X^*_u(k) \quad \text{Eq. (1),}$$

where $Y_u(k, r)$ is the received RS in frequency domain for sample k, from the UE u at the receive branch r, and $X_u^*(k)$ is the signal transmitted in frequency domain for sample k, for the UE u. In some embodiments, the branch r represents one antenna in the antenna arrays or one of the radiation beams.

Referring to the operation S22, a pre-TA compensated channel estimation $\hat{H}_{mf,TA}$ is obtained. The pre-TA compensated channel estimation $\hat{H}_{mf,TA}$ is calculated based on the matched filter channel estimation $\hat{H}_{mf}$. In some embodiments, the pre-TA compensated channel estimation $\hat{H}_{mf,TA}$ can be denoted as $H_{mf,TA\ u}(k, r)$ calculated by the following equation Eq. (2):

$$\hat{H}_{mf,TA,u}(k,r) = \hat{H}_{mf,u}(k,r) \cdot \theta_{Pre,TA,u}(k) \quad \text{Eq. (2)}$$

where $\Delta f$ is the matched filter channel estimation, and $\theta_{pre,TA,u}(k)$ is a TA compensation phase (also can be referred to "pre-TA compensation phase").

In some embodiments, the pre-TA compensation phrase $\theta_{pre,TA\ u}(k)$ can be calculated by the following equation Eq. (3):

$$\theta_{pre,TA,u}(k) = \exp(j \cdot 2\pi \cdot (L_{RS} \cdot k + k_{first,u}) \cdot \Delta f \cdot TA_{acc,u}) \quad \text{Eq. (3),}$$

where $\Delta f$ is the subcarrier spacing between two adjacent subcarriers, $L_{RS}$ is the number of subcarrier spacings between two RS frequency samples, and $k_{first,u}$ is the index of the first subcarrier in the whole bandwidth for RS of the UE u and $TA_{acc,u}$ is accumulated TA.

In some embodiments, the accumulated TA $TA_{acc,u}$ can be calculated by the following equation Eq. (4):

$$TA_{acc,u} = TA_{acc,u,pre} + TA_u \quad \text{Eq. (4),}$$

where $TA_u$ is the TA estimation for the UE u obtained via the previous TA estimation process and $TA_{acc,u,\ pre}$ is the previous accumulated TA. The initial value of $TA_{acc,u}$ is zero.

In FIG. 2, the pre-TA compensation (e.g., operation 22) uses TA estimation obtained from previous process. For example, if the process in FIG. 2 is performed based on the RS received in a single reception, the accumulated TA used in S22 in this reception may be updated based on the TA estimation $TA_u$ estimated by the operation S24 for the last reception.

Referring to the operation S23, noise and interference suppressed channel estimation R' is obtained. In the operation S23, the noise and the interference from other UEs can be suppressed. In some embodiments, the operation S23 may include the following steps: converting the pre-TA compensated channel estimation $\hat{H}_{mf,TA}$ from frequency domain to time domain by, for example, inverse fast Fourier transform (IFFT) or discrete cosine transform (DCT) to obtain a plurality of channel taps; selecting one or more proper channel taps from the obtained channel taps; and then converting the selected channel taps from time domain to frequency domain to obtain the noise and interference suppressed channel estimation Ĥ'. It is appreciated that there are many convention noise and interference suppressing technologies, and the noise and the interference operation applied by the present disclosure is not limited to the above embodiments.

Referring to the operation S24, TA estimation TA associated with the UE is obtained. The TA estimation TA is obtained based on the noise and interference suppressed channel estimation Ĥ'. In some embodiments, the TA estimation can be denoted as $TA_u$ obtained by the following steps: selecting one or more branches from a plurality of branches received from the UE based on power levels of the received branches; calculating TA values for each of the selected branches; and obtaining the TA estimation by combining the calculated TA values.

In some embodiments, the power level $P_{rs,u,r}$ of each received branch can be calculated by the following equation Eq. (5):

$$P_{rs,u,r} = (\Sigma_{k=0}^{N_c-1} \hat{H}'_u(k,r) \cdot \text{conj}(\hat{H}'_u(k,r))) \quad \text{Eq. (5).}$$

Then, one or more branches are selected based on the power level of each received branch. In some embodiments, only the branches with the power level higher than a predetermined value are selected. In other embodiments, only the branch with the highest power level is selected.

In some embodiments, the TA value $TA_{u,r}$ for each of the selected branches is calculated by the following equation Eq. (6):

$$TA_{u,r} = \frac{-1}{2\pi \cdot L_{RS} \cdot \Delta f \cdot \Delta k} \cdot \arg\left(\sum_{k=0}^{N_c-1-\Delta k} \hat{H}'_u(k+\Delta k, r) \cdot \text{conj}(\hat{H}'_u(k, r))\right), \quad \text{Eq. (6)}$$

where $\Delta f$ is the subcarrier spacing (e.g., 15 kHz), $\Delta k$ is an adjustable factor greater than or equal to 1, and $N_c$ is the number of RS samples in frequency domain used for the TA estimation. The adjustable factor $\Delta k$ would affect the range and the accuracy of the TA estimation. For example, as $\Delta k$ increases, the range for the TA estimation decreases while the accuracy of the TA estimation increases, and vice versa.

The TA estimation $TA_u$ for a UE u is generated by combining TA values $TA_{u,r}$ for the selected branches. For example, the TA estimation $TA_u$ can be calculated by the following equation Eq. (7):

$$TA_u = \frac{1}{\Sigma_{r \in B_{TA,u}} P_{rs,u,r}} \Sigma_{r \in B_{TA,u}} (P_{rs,u,r} \cdot TA_{u,r}), \quad \text{Eq. (7)}$$

where $B_{TA,u}$ is the selected branches (e.g., the branch with the highest power level $P_{rs,u,r}$).

It is appreciated that the TA estimation can be achieve by various existing technologies, and can be done in either time domain or frequency domain. Thus, the TA estimation applied by the present disclosure is not limited here.

Referring to the operation S25, post-TA compensated channel estimation $\hat{H}'_{TA}$ is obtained. In some embodiments, post-TA compensated channel estimation is obtained by the following steps: calculating a post-TA compensation phrase $\theta_{post,TA}$ based on the TA estimation; and calculating the post-TA compensated channel estimation $\hat{H}'_{TA}$ based on the noise and interference suppressed channel estimation $\hat{H}'$ and the post-TA compensation phrase $\theta_{post,TA}$.

In some embodiments, the post-TA compensated channel estimation $\hat{H}'_{TA}$ can be denoted as $\hat{H}'_{TA,u}(k, r)$ calculated by the following equation Eq. (8):

$$\hat{H}'_{TA,u}(k,r) = \hat{H}'_u(k,r) \cdot \theta_{post,TA,u}(k) \quad \text{Eq. (8)},$$

where $\hat{H}'_u(k, r))$ is the noise and interference suppressed channel estimation, $\theta_{post,TA,u}(k)$ is the post-TA compensation phase.

In some embodiments, the post-TA compensation phrase $\theta_{post,TA,u}(k)$ can be calculated by the following equation Eq. (9):

$$\theta_{post,TA,u}(k) = \exp(j \cdot 2\pi \cdot (L_{RS} \cdot k + k_{first,u}) \cdot \Delta f \cdot TA_u) \quad \text{Eq. (9)},$$

where $\Delta f$ is the subcarrier spacing between two adjacent subcarriers, $L_{RS}$ is the number of subcarrier spacing between two adjacent RS frequency samples, and $k_{first,u}$ is the index of the first subcarrier in the whole bandwidth for RS of the UE u.

Referring the operation S26, beaming weights for branches received from the UE are obtained. In some embodiments, the branch represents one antenna in the antenna arrays or one of the radiation beams. In some embodiments, the beaming weights can be calculated based on the post-TA compensated channel estimation.

In accordance with the embodiments illustrated in FIG. 2, since both the pre-TA compensation (i.e., the operation S22) and the post-TA compensation (i.e., the operation S25) are performed to compensate the channel estimation, a high accuracy of channel estimation and a high accuracy of TA estimation are obtained, which would in turn improve the performance (e.g., the calculation of the beamforming weights) of a TDD system.

Figure 3:
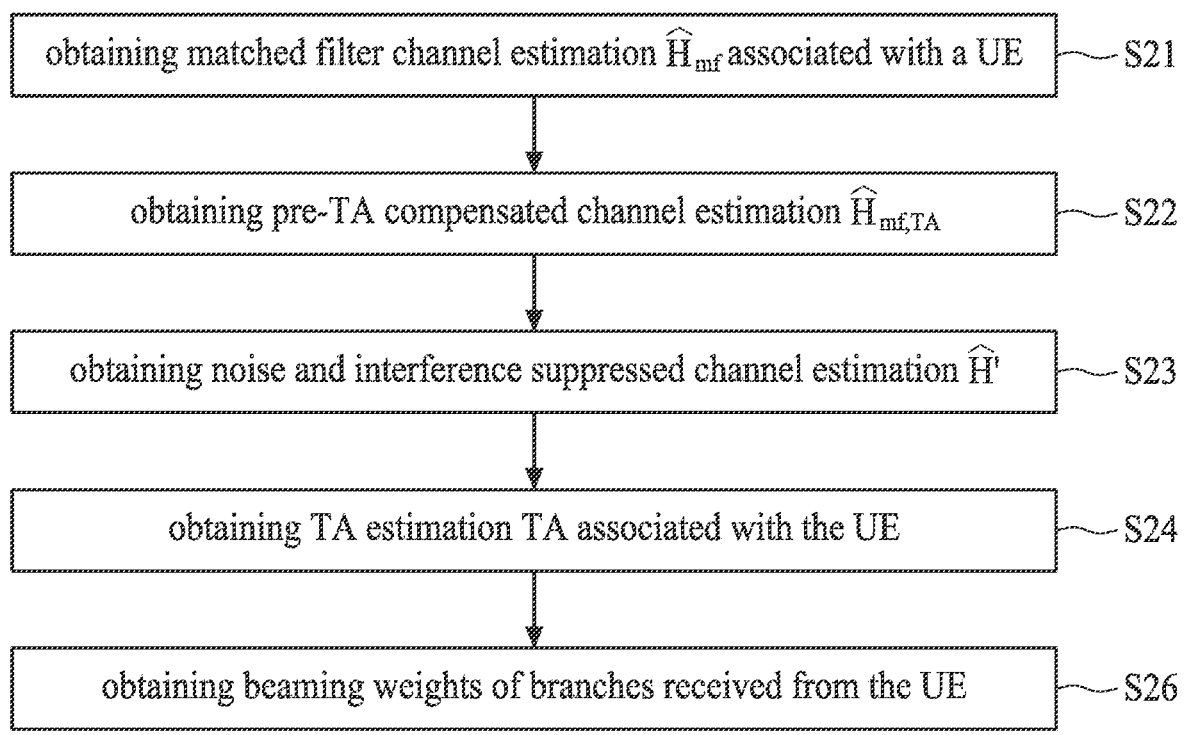
FIG. 3 is a flowchart illustrating a method in accordance with some embodiments of the present disclosure.

FIG. 3 is a flowchart illustrating a method in accordance with some embodiments of the present disclosure. In some embodiments, the method in FIG. 3 can be performed by the system 1 as shown in FIG. 1. Alternatively, the method in FIG. 3 can be performed by any other suitable systems or modules of a communication node.

The method illustrated in FIG. 3 is similar to that illustrated in FIG. 2 except that in FIG. 3, the post-TA compensation (i.e., the operation S25) is omitted. For example, after obtaining TA estimation associated with the UE at the operation S24, the TA estimation is fed to perform the pre-TA compensation for next process and the beaming weights of branches received from the UE is obtained at the operation S26. In some embodiments, the branch represents one antenna in an antenna arrays or one of the radiation beams. In some embodiments, the beaming weights can be calculated based on the noise and interference suppressed channel estimation $\hat{H}'$ obtained at the operation S23.

In accordance with the embodiments illustrated in FIG. 3, since the pre-TA compensation (i.e., the operation S22) is performed to compensate the channel estimation before obtaining the TA estimation, a high accuracy of channel estimation and a high accuracy of TA estimation are obtained, which would in turn improve the performance (e.g., the calculation of the beamforming weights) of a TDD system.

Figure 4:
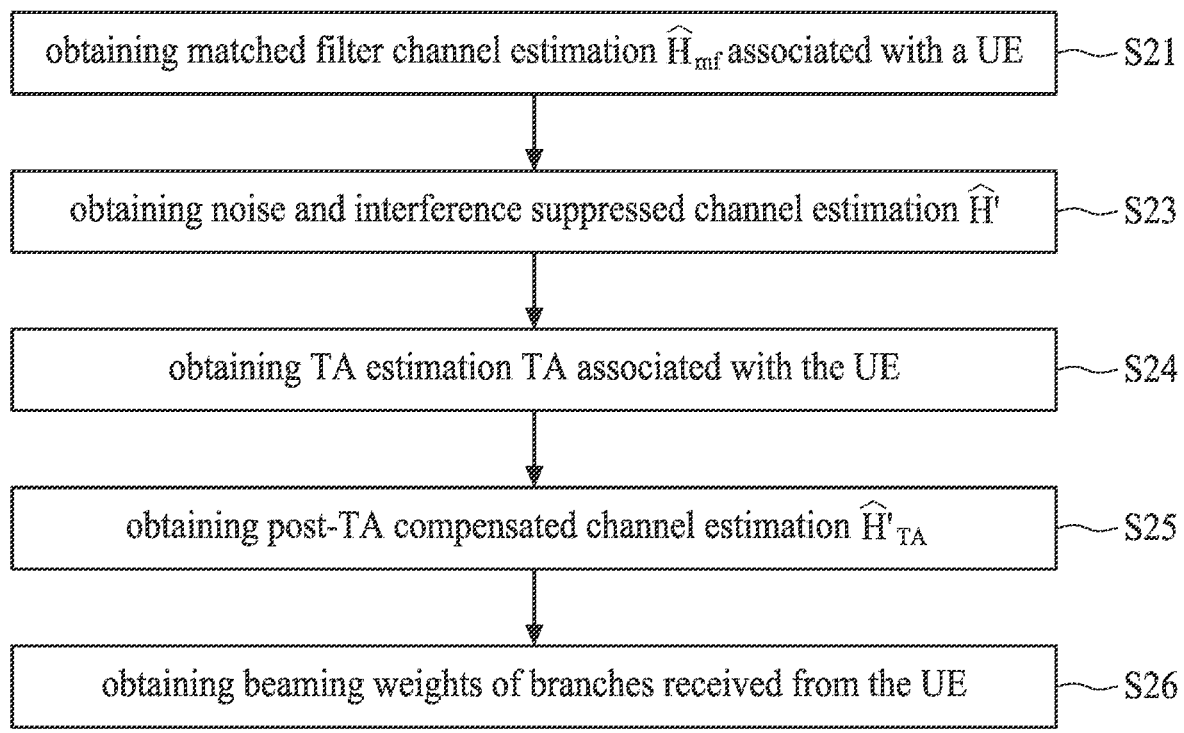
FIG. 4 is a flowchart illustrating a method in accordance with some embodiments of the present disclosure.

FIG. 4 is a flowchart illustrating a method in accordance with some embodiments of the present disclosure. In some embodiments, the method in FIG. 4 can be performed by the system 1 as shown in FIG. 1. Alternatively, the method in FIG. 4 can be performed by any other suitable systems or modules of a communication node.

The method illustrated in FIG. 4 is similar to that illustrated in FIG. 2 except that in FIG. 4, the pre-TA compensation (i.e., the operation S22) is omitted. For example, after obtaining the matched filter channel estimation $\hat{H}_{mf}$ associated with the UE at the operation S21, the noise and interference suppressed channel estimation $\hat{H}'$ is obtained at the operation S23. In some embodiments, the noise and interference suppressed channel estimation $\hat{H}'$ can be calculated based on the matched filter channel estimation $\hat{H}_{mf}$ obtained at the operation S21.

In accordance with the embodiments illustrated in FIG. 4, since the post-TA compensation (i.e., the operation S25) is performed to compensate the channel estimation, a high accuracy of channel estimation and a high accuracy of TA estimation are obtained, which would in turn improve the performance (e.g., the calculation of the beamforming weights) of a TDD system.

Figure 5:
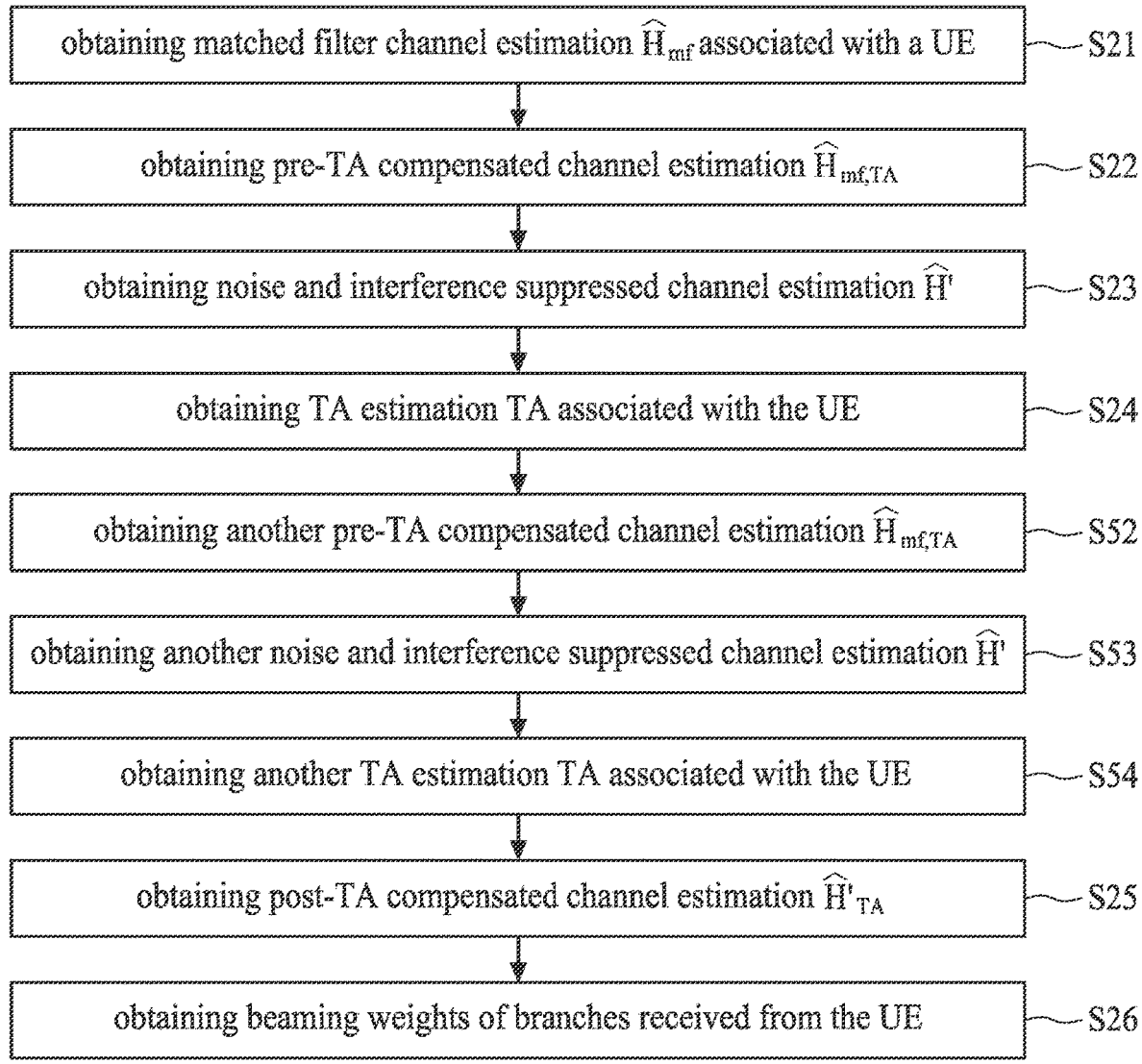
FIG. 5 is a flowchart illustrating a method in accordance with some embodiments of the present disclosure.

FIG. 5 is a flowchart illustrating a method in accordance with some embodiments of the present disclosure. In some embodiments, the method in FIG. 5 can be performed by the system 1 as shown in FIG. 1. Alternatively, the method in FIG. 5 can be performed by any other suitable systems or modules of a communication node. The method illustrated in FIG. 5 is similar to that illustrated in FIG. 2 and the differences therebetween are described below.

As shown in FIG. 5, after the TA estimation is obtained at the operation S24 by, for example, the TA estimation module 14 as shown in FIG. 1, the TA estimation is fed to the TA compensation module 12 for obtaining another pre-TA compensated channel estimation $\hat{H}_{mf,TA}$ (or can be referred to as "second pre-TA compensated channel estimation) at the operation S52. For example, the second pre-TA compensated channel estimation $\hat{H}_{mf,TA}$ is obtained based on the generated TA estimation. In some embodiments, the steps for calculating the second pre-TA compensated channel estimation (e.g., operation S52) are similar to those recited in the operation S22. In some embodiments, the accumulated TA can be updated based on the TA estimation $TA_u$ for the UE u obtained via the operation S24 in the same process. For example, if the process is performed based on the RS received in a single reception, the accumulated TA used in S52 in this reception can be updated based on the TA estimation $TA_u$ estimated by the operation S24 for the same reception. In some embodiments, the accumulated TA used in the operation S22 in this reception can be updated based on the TA estimation $TA_u$ estimated by the operation S54 for the last reception.

Referring to the operation S53, another noise and interference suppressed channel estimation $\hat{H}'$ (or can be referred to as "second noise and interference suppressed channel estimation") is obtained based on the second pre-TA compensated channel estimation $\hat{H}_{mf,TA}$. In some embodiments, the steps for obtaining the second noise and interference suppressed channel estimation R' are similar to those recited in the operation S23.

Referring to the operation S54, another TA estimation (or can be referred to as "second TA estimation") is obtained based on the second noise and interference suppressed channel estimation $\hat{H}'$. In some embodiments, the steps for obtaining the second TA estimation are similar to those recited in the operation S24. After the second TA estimation is obtained, the post-TA compensated channel estimation $\hat{H}'_{TA}$ is obtained based on the second TA estimation at the operation S25, and then the beaming weights of branches received from the UE is obtained at the operation S26. In some embodiments, the branch represents one antenna in an antenna arrays or one of the radiation beams.

In some preferred embodiments, the operations S21-S24 in FIG. 5 may be performed for some branches with better performance, such as branches with higher power. In some embodiments, the branches with higher power could be obtained from last RS reception. After the first TA estimation is obtained, it can be used to perform pre-TA compensation (i.e., the operation S52) for all branches. Then, the following operations are also performed for all branches, so as to obtain the beaming weights of branches received from the UE. Since operations S21-S24 may be performed for a few branches, it would not cost too much processing resource.

In accordance with the embodiments illustrated in FIG. 5, compared with the embodiment illustrated in FIG. 2, one more pre-TA compensation and one more noise and interference suppressed channel estimation are performed, a higher accuracy of channel estimation and a higher accuracy of TA estimation are obtained, which would further in turn improve the performance (e.g., the calculation of the beamforming weights) of a TDD system.

Figure 6:
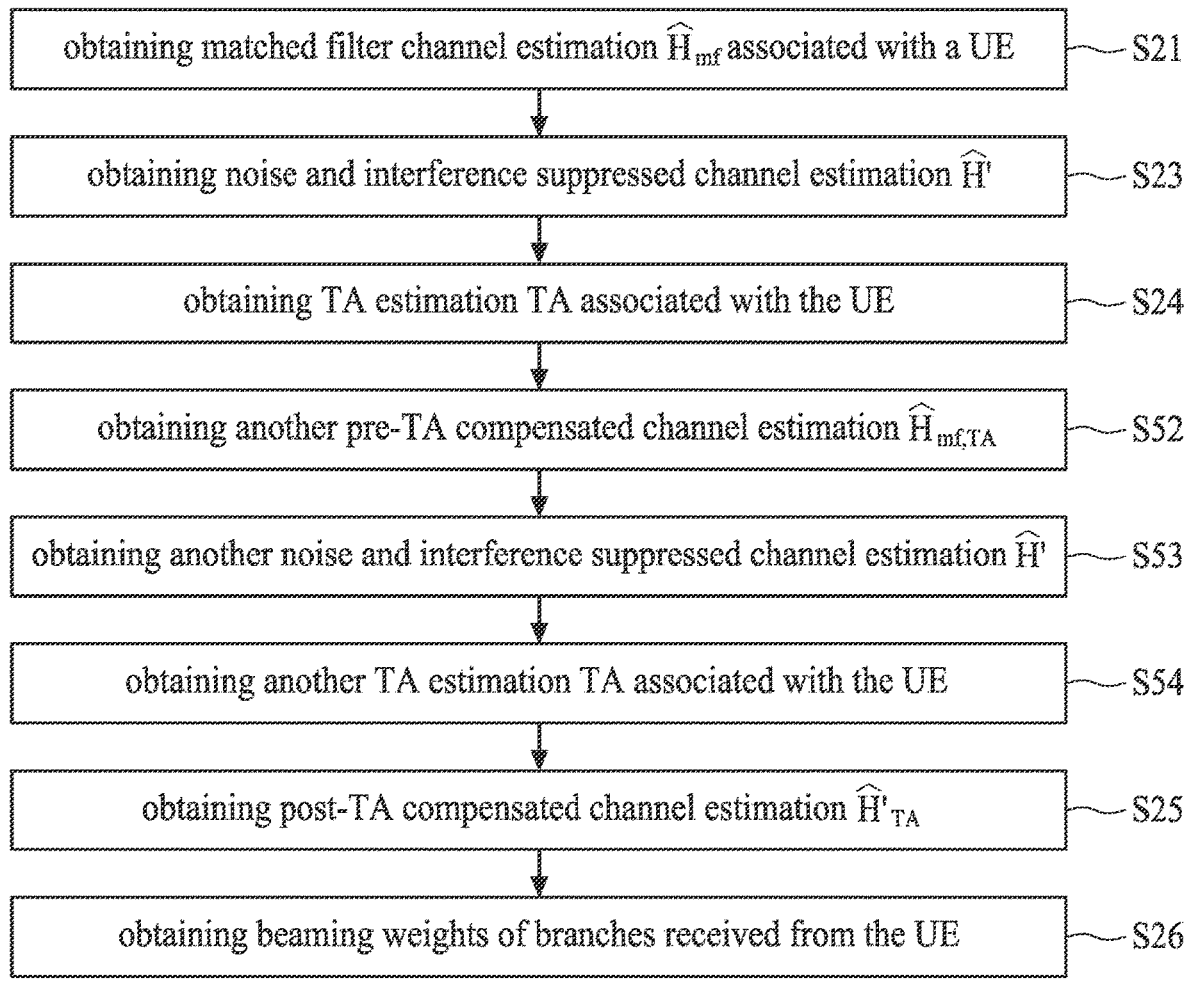
FIG. 6 is a flowchart illustrating a method in accordance with some embodiments of the present disclosure.

FIG. 6 is a flowchart illustrating a method in accordance with some embodiments of the present disclosure. In some embodiments, the method in FIG. 6 can be performed by the system 1 as shown in FIG. 1. Alternatively, the method in FIG. 6 can be performed by any other suitable systems or modules of a communication node.

The method illustrated in FIG. 6 is similar to that illustrated in FIG. 5 except that in FIG. 6, the first pre-TA compensation (i.e., the operation S22) is omitted. For example, after obtaining the matched filter channel estimation $\hat{H}_{mf}$ associated with the UE at the operation S21, the noise and interference suppressed channel estimation $\hat{H}'$ is obtained at the operation S23. In some embodiments, the noise and interference suppressed channel estimation $\hat{H}'$ can be calculated based on the matched filter channel estimation $\hat{H}_{mf}$ obtained at the operation S21.

In some preferred embodiments, operations S21, S23 and S24 in FIG. 6 may be performed for some branches with better performance, such as branches with higher power. After the first TA estimation is obtained, it can be used to perform pre-TA compensation (i.e., the operation S52) for all branches. In some embodiments, since the first pre-TA compensation (i.e., the operation S22) is omitted, in the operation S52 illustrated in FIG. 6, the second pre-TA compensation is obtained based on immediate TA $TA_u$ instead of accumulated TA $TA_{acc,u}$. Then, the following operations are also performed for all branches, so as to obtain the beaming weights of branches received from the UE. In some embodiments, the branch represents one antenna in an antenna arrays or one of the radiation beams.

Figure 7:
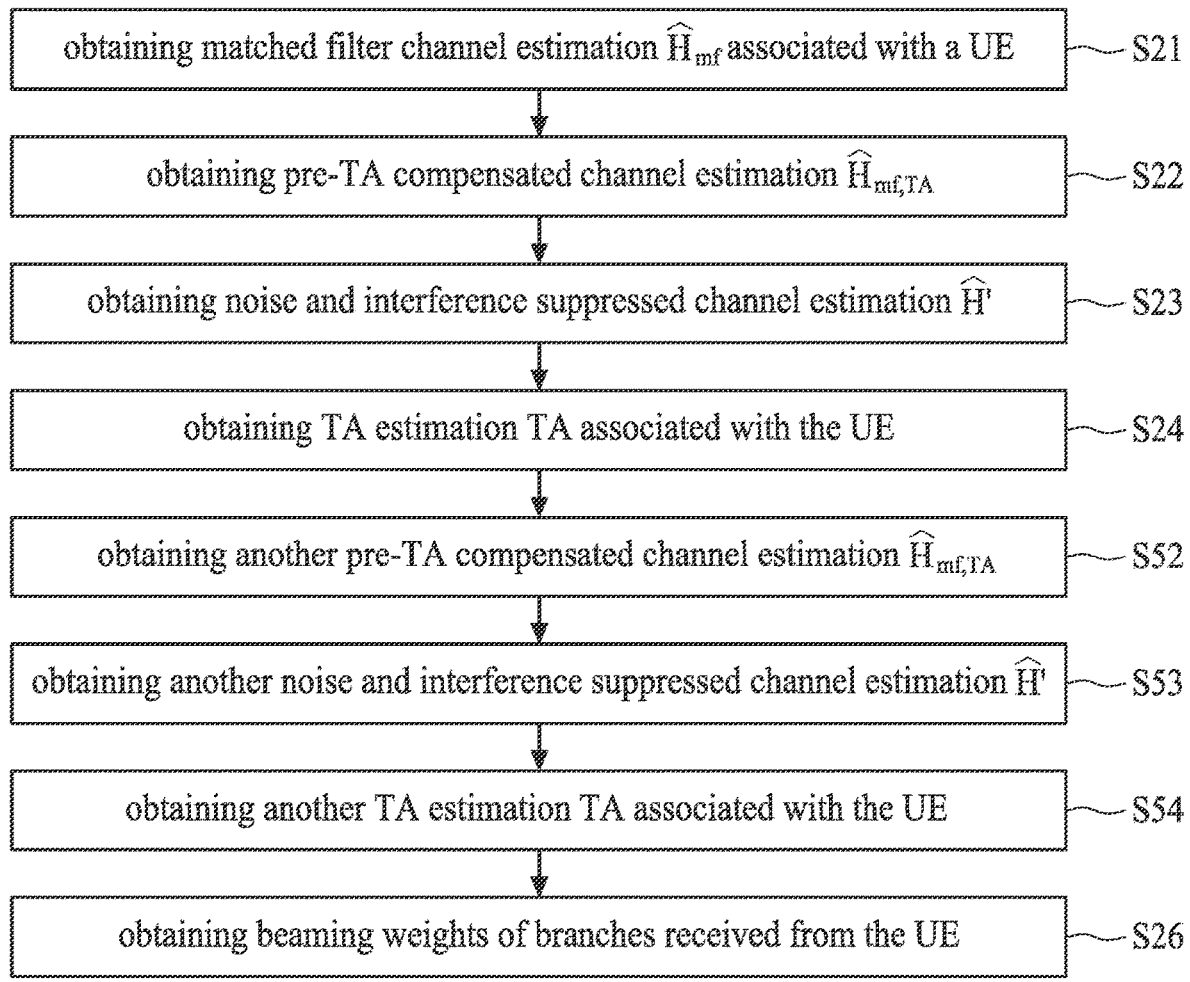
FIG. 7 is a flowchart illustrating a method in accordance with some embodiments of the present disclosure.

FIG. 7 is a flowchart illustrating a method in accordance with some embodiments of the present disclosure. In some embodiments, the method in FIG. 7 can be performed by the system 1 as shown in FIG. 1. Alternatively, the method in FIG. 7 can be performed by any other suitable systems or modules of a communication node.

The method illustrated in FIG. 7 is similar to that illustrated in FIG. 5 except that in FIG. 7, the post-TA compensation (i.e., operation S25) is omitted. For example, after obtaining second TA estimation associated with the UE at the operation S54, the beaming weights of branches received from the UE is obtained at the operation S26. In some embodiments, the branch represents one antenna in an antenna arrays or one of the radiation beams. In some embodiments, the beaming weights can be calculated based on the second noise and interference suppressed channel estimation $\hat{H}'$ obtained at the operation S53.

In some preferred embodiments, operations S21-S24 in FIG. 7 may be performed for some branches with better performance, such as branches with higher power. After the first TA estimation is obtained, it can be used to perform pre-TA compensation (i.e., the operation S52) for all branches. Then, the following operations are also performed for all branches, so as to obtain the beaming weights of branches received from the UE.

Figure 8:
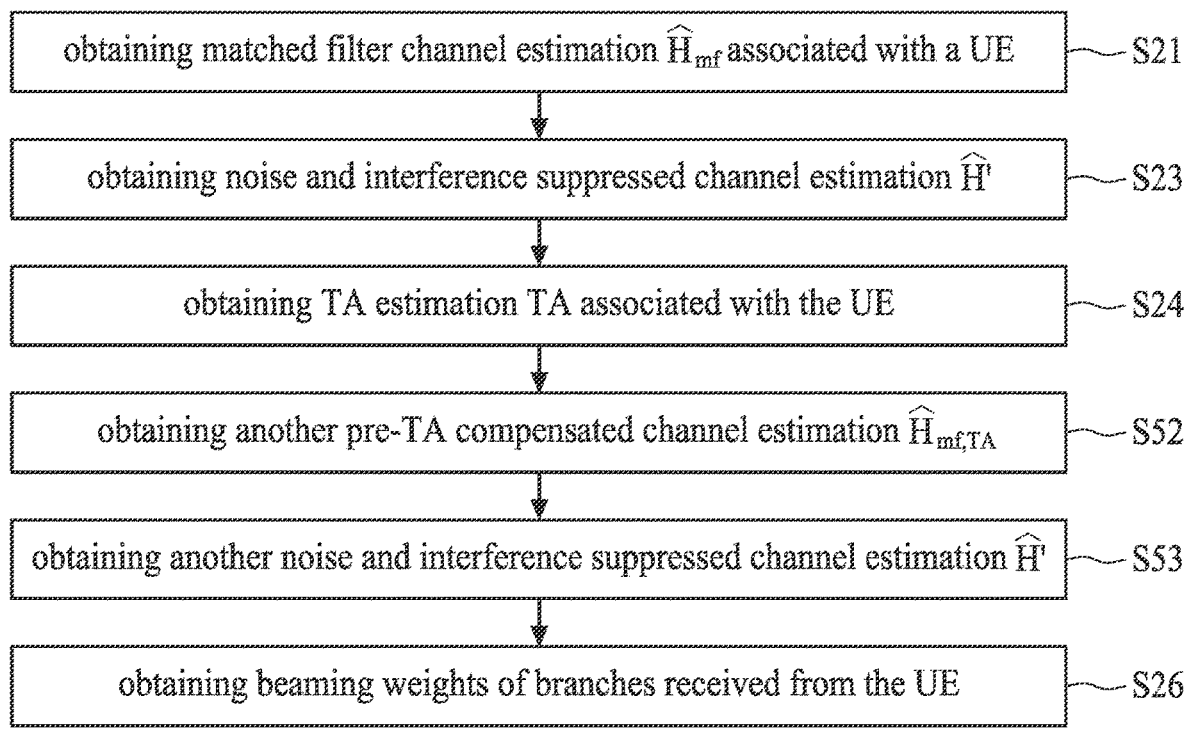
FIG. 8 is a flowchart illustrating a method in accordance with some embodiments of the present disclosure.

FIG. 8 is a flowchart illustrating a method in accordance with some embodiments of the present disclosure. In some embodiments, the method in FIG. 8 can be performed by the system 1 as shown in FIG. 1. Alternatively, the method in FIG. 8 can be performed by any other suitable systems or modules of a communication node.

The method illustrated in FIG. 8 is similar to that illustrated in FIG. 7 except that in FIG. 8, the first pre-TA compensated channel estimation (i.e., the operation S22) and the second TA estimation (i.e., the operation S54) are omitted. For example, after obtaining the matched filter channel estimation $\hat{H}_{mf}$ associated with the UE at the operation S21, the noise and interference suppressed channel estimation $\hat{H}'$ is obtained at the operation S23. In some embodiments, the noise and interference suppressed channel estimation $\hat{H}'$ can be calculated based on the matched filter channel estimation $\hat{H}_{mf}$ obtained at the operation S21. In addition, after obtaining the second noise and interference suppressed channel estimation $\hat{H}'$ at the operation S53, beaming weights of branches received from the UE is obtained at the operation S26 based on the second noise and interference suppressed channel estimation obtained at the operation S53. In some embodiments, the branch represents one antenna in an antenna arrays or one of the radiation beams.

In some preferred embodiments, operations S21, S23 and S24 in FIG. 8 may be performed for some branches with better performance, such as branches with higher power. After the first TA estimation is obtained, it can be used to perform pre-TA compensation (i.e., the operation S52) for all branches. In some embodiments, since the first pre-TA compensation (i.e., the operation S22) is omitted, in the operation S52 illustrated in FIG. 8, the second pre-TA compensation is obtained based on immediate TA $TA_u$ instead of accumulated TA $TA_{acc,u}$. Then, the following operations are also performed for all branches, so as to obtain the beaming weights of branches received from the UE.

Figure 9:
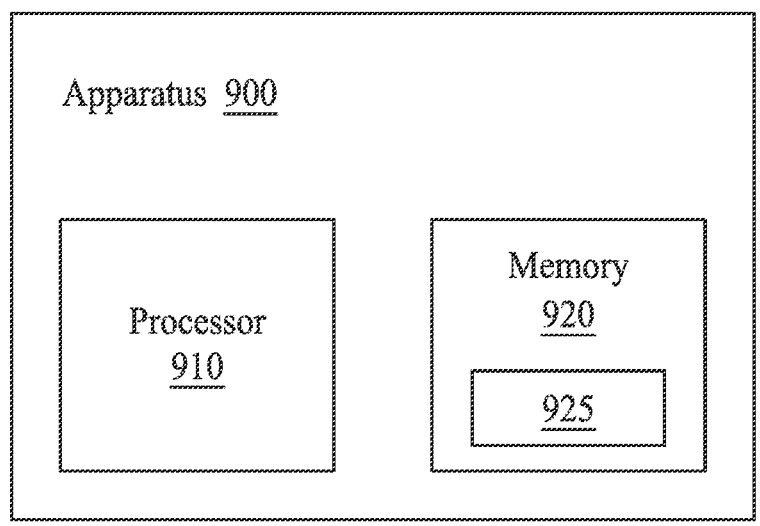
FIG. 9 is a block diagram illustrating an apparatus according to some embodiments of the present disclosure.

FIG. 9 is a block diagram illustrating an apparatus 900 according to some embodiments of the present disclosure. As shown in FIG. 9, the apparatus 900 may include one or more processors such as processor 910 and one or more memories such as a memory 920 storing computer program codes 925. The memory 920 may be a non-transitory machine/processor/computer readable storage medium. In accordance with some exemplary embodiments, the apparatus 900 may be implemented as an integrated circuit chip or module that can be plugged or installed into a communication node, such as a base station.

In some implementations, the one or more memories 920 and the computer program codes 925 may be configured to, with the one or more processors 910, cause the apparatus 900 at least to perform any step of the method described in connection with any one of FIGS. 2, 3, 4, 5, 6, 7 and 8.

Alternatively or additionally, the one or more memories 920 and the computer program codes 925 may be configured to, with the one or more processors 910, cause the apparatus 900 at least to perform more or less operations to implement the proposed methods according to the exemplary embodiments of the present disclosure.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or any other computing device, although the present disclosure is not limited thereto. While various aspects of the exemplary embodiments of the present disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the present disclosure may be practiced in various components such as integrated circuit chips and modules. It should thus be appreciated that the exemplary embodiments of the present disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of the present disclosure.

It should be appreciated that at least some aspects of the exemplary embodiments of the present disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other devices. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays, and the like.

The present disclosure includes any novel feature or combination of the features disclosed herein either explicitly or any generalization thereof. Various modifications and adaptations to the foregoing exemplary embodiments of the present disclosure may become apparent to those skilled in the relevant arts in view of the foregoing description, when read in conjunction with the accompanying drawings. However, any and all modifications will still fall within the scope of the non-limiting and exemplary embodiments of the present disclosure.

What is claimed is:

1. A method performed by a communication node, comprising:
    obtaining matched filter channel estimation associated with a user equipment (UE);
    obtaining first Timing Advance (TA) compensated channel estimation;
    obtaining first noise suppressed channel estimation;
    obtaining first TA estimation associated with the UE based on the first noise suppressed channel estimation; and
    obtaining the first TA compensated channel estimation further comprising obtaining a TA compensation phase based on the first TA estimation, obtaining the first TA compensated channel estimation based on the first noise suppressed channel estimation and the TA compensation phase, and optionally, further comprising obtaining beaming weights of branches received from the UE based on the first TA compensated channel estimation.

2. The method of claim 1, wherein the first noise suppressed channel estimation is obtained based on the first TA compensated channel estimation,
    and optionally, wherein obtaining the first TA compensated channel estimation further comprising:
    obtaining accumulated TA;
    obtaining a first TA compensation phase based on the accumulated TA; and
    obtaining the first TA compensated channel estimation based on the matched filter channel estimation and the first TA compensation phase,
    and optionally, wherein the accumulated TA is obtained based on previously obtained TA estimation.

3. The method of claim 2, further comprising obtaining second TA compensated channel estimation after obtaining the first noise suppressed channel estimation,
    and optionally, wherein obtaining the second TA compensated channel estimation further comprising:
    obtaining a second TA compensation phase based on the first TA estimation; and
    obtaining the second TA compensated channel estimation based on the first noise suppressed channel estimation and the second TA compensation phase.

4. The method of claim 2, further comprising obtaining second TA compensated channel estimation after obtaining the first TA estimation,
    and further comprising obtaining the second noise suppressed channel estimation, which comprises:
    converting the second TA compensated channel estimation from frequency domain to time domain to obtain a plurality of channel taps;
    selecting one or more channel taps from the obtained channel taps; and
    converting the selected channel taps from time domain to frequency domain,
    and optionally, further comprising obtaining second TA estimation for the UE based on the second noise suppressed channel estimation,
    and optionally, further comprising obtaining third TA compensated channel estimation based on the second TA estimation and the second noise suppressed channel estimation, or further comprising obtaining beaming weights of branches received from the UE based on the third TA compensated channel estimation.

5. The method of claim 1, wherein obtaining the first noise suppressed channel estimation further comprising:
    converting the first TA compensated channel estimation from frequency domain to time domain to obtain a plurality of channel taps;
    selecting one or more channel taps from the obtained channel taps; and
    converting the selected channel taps from time domain to frequency domain.

6. The method of claim 1, wherein obtaining the first TA estimation for the UE further comprising:
   selecting one or more branches from a plurality of branches received from the UE based on power levels of the received branches;
   obtaining TA values for each of the selected branches; and
   obtaining the first TA estimation by combining the TA values.

7. The method of claim 1, wherein the first TA compensated channel estimation is obtained after the first noise suppressed channel estimation.

8. The method of claim 1, further comprising obtaining beaming weights of branches received from the UE based on the first TA estimation.

9. The method of claim 1, wherein the first TA compensated channel estimation is obtained after the first TA estimation.

10. The method of claim 1, wherein obtaining the first TA compensated channel estimation further comprising:
    obtaining a first TA compensation phrase phase based on the first TA estimation; and
    obtaining the first TA compensated channel estimation based on the matched filter channel estimation and the first TA compensation phase,
    and optionally, further comprising obtaining second noise suppressed channel estimation, which comprises:
    converting the first TA compensated channel estimation from frequency domain to time domain to obtain a plurality of channel taps;
    selecting one or more channel taps from the obtained channel taps; and
    converting the selected channel taps from time domain to frequency domain,
    or further comprising obtaining second TA estimation for the UE based on the second noise suppressed channel estimation.

11. The method of claim 1, further comprising obtaining second TA compensated channel estimation after the determination of the second TA estimation.

12. The method of claim 1, further comprising obtaining beaming weights of branches received from the UE based on the second TA estimation.

13. An apparatus, comprising:
    one or more processors; and
    one or more memories comprising computer program codes,
    the one or more memories and the computer program codes configured to, with the one or more processors, cause the apparatus at least to:
    obtain matched filter channel estimation associated with a user equipment (UE);
    obtain first Timing Advance (TA) compensated channel estimation;
    obtain first noise suppressed channel estimation;
    obtain first TA estimation associated with the UE based on the first noise suppressed channel estimation; and
    obtain the first TA compensated channel estimation further comprising obtaining a TA compensation phase based on the first TA estimation, obtaining the first TA compensated channel estimation based on the first noise suppressed channel estimation and the TA compensation phase, and optionally, further comprising obtaining beaming weights of branches received from the UE based on the first TA compensated channel estimation.

14. A non-transitory computer-readable medium having computer program codes embodied thereon for use with a computer, wherein the computer program codes comprise codes for causing a communication node to perform a method, the method comprising: obtaining matched filter channel estimation associated with a user equipment (UE); obtaining first Timing Advance (TA) compensated channel estimation; obtaining first noise suppressed channel estimation: obtaining first TA estimation associated with the UE based on the first noise suppressed channel estimation; and obtaining the first TA compensated channel estimation further comprising obtaining a TA compensation phase based on the first TA estimation, obtaining the first TA compensated channel estimation based on the first noise suppressed channel estimation and the TA compensation phase, and optionally, further comprising obtaining beaming weights of branches received from the UE based on the first TA compensated channel estimation.

* * * * *